Nov. 27, 1956 J. C. FISHER ET AL 2,772,194
METHOD OF APPLYING VINYL PLASTISOL
LAYERS TO CURED CELLULAR RUBBER
Filed Oct. 29, 1953 2 Sheets-Sheet 1
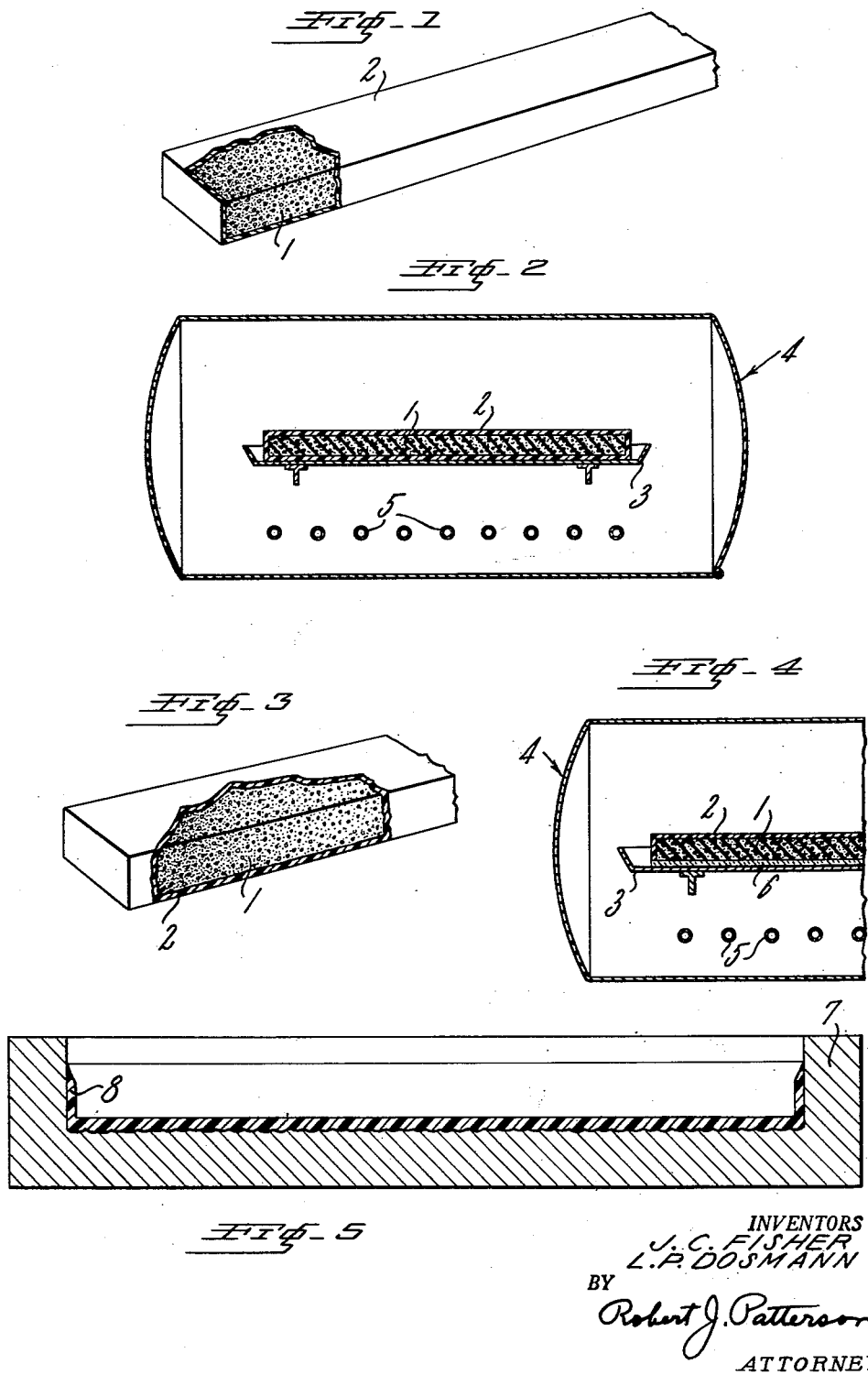
INVENTORS
J. C. FISHER
L. P. DOSMANN
BY
Robert J. Patterson
ATTORNEY Nov. 27, 1956

J. C. FISHER ET AL 2,772,194

METHOD OF APPLYING VINYL PLASTISOL
LAYERS TO CURED CELLULAR RUBBER

Filed Oct. 29, 1953

INVENTORS
J. C. FISHER
L. P. DOSMANN
BY
Robert J. Patterson
ATTORNEY

United States Patent Office 2,772,194
Patented Nov. 27, 1956

2,772,194

METHOD OF APPLYING VINYL PLASTISOL LAYERS TO CURED CELLULAR RUBBER

Jack C. Fisher, Mishawaka, and Lucian P. Dosmann, South Bend, Ind., assignors to United States Rubber Company, New York, N. Y., a corporation of New Jersey Application October 29, 1953, Serial No. 389,048

3 Claims. (Cl. 154—100)

This invention relates to the direct coating of cured cellular rubber with a liquid plastisol and subsequent fusion of the plastisol whereby there is provided an article of manufacture combining the advantages of lightness and compressibility of the cellular rubber body with the advantages of a surface coating of fused plastisol.

The principal object of the present invention is to make readily possible the manufacture of articles comprising a body of cured cellular rubber substantially free from heat deterioration and having directly adhered to its surface a coating or layer of plasticized vinyl resin formed by heat fusion in situ of a coating or layer of a vinyl resin plastisol. Another object is to provide a method of making such articles in which the body of cellular rubber is protected from being adversely affected by the heat required to convert the plastisol coating into the fused form essential for good physical properties. Another object is to provide such a method which insures that the ultimate plasticized vinyl resin coating is directly and tenaciously adhered to the underlying cellular rubber body. Numerous other objects of our invention will more fully hereinafter appear.

In the accompanying drawings:

Fig. 1 portrays a rectangular strip of cured cellular rubber completely surrounded with a coating of a liquid plastisol, preparatory to the fusion step;

Fig. 2 is a sectional view showing the coated article of Fig. 1 after placement in an oven for fusion of the plastisol coating;

Fig. 3 portrays the final plasticized vinyl resin-coated article obtained upon cooling the coated article produced by the fusion step of Fig. 2;

Fig. 4 is a partial view like Fig. 2 but with heat insulating means provided for the protection of the uncoated lower surface of the cellular rubber article;

Fig. 5 is a sectional view of an open mold slushed with a plastisol, preparatory to manufacture of a locker sandal platform;

Figure 6:
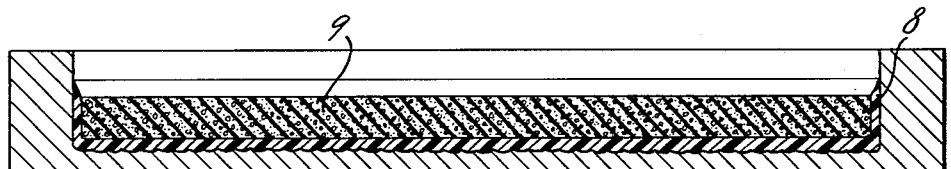
Fig. 6 is a sectional view showing a body of cellular rubber in place in the coated mold of Fig. 5.
Figure 7:
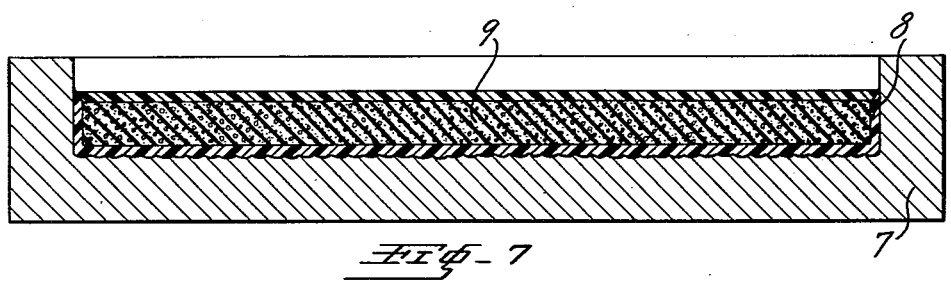
Fig. 7 is like Fig. 6 but after the application of plastisol on the upper portion of the cellular rubber body.
Figure 8:
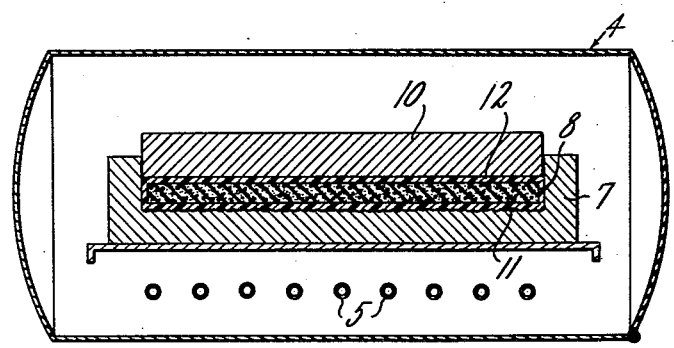
Fig. 8 is a sectional view showing the step of heating the assembly of Fig. 7 to effect fusion of the surrounding plastisol layer.

The present invention is based upon our discovery that a plastisol coating or layer applied directly to the surface of a cured body of cellular rubber will provide sufficient insulation that no appreciable degradation or deterioration of the cellular rubber body will occur when heat is applied to the plastisol to fuse the same. It was highly unexpected to discover that it was possible to apply to such a layer of plastisol heat of a degree and for a period of time sufficient to fuse the plastisol without causing the underlying cellular rubber to break down and lose its properties, because it was known that cellular rubber could not be exposed to heat of the required magnitude without undergoing collapse and such loss of properties as to become a worthless mass. It is well-known that in order to fuse a plastisol, a temperature of at least 300° F. is required, temperatures of from 400° to 450° F. commonly being used and it is also well-known that exposure of cellular rubber bodies to temperatures of this order will result in such injury as to render them valueless for their intended use.

In the practice of our invention there may be collapse of an exceedingly thin layer of the cellular rubber immediately adjacent the inner surface of the plastisol coating during the heat fusion step. However any such collapse is not substantial and does not appreciably reduce the dimensions of the cellular rubber body. The tenacious bonding of the final plasticized resin coating to the underlying cellular rubber body is the result of fusion of the plastisol at the interface whereby the fused plastisol layer is caused to penetrate into minute interstices or openings in the outer surface of the cellular rubber body thereby effecting a mechanical locking of the fused plastisol layer to the cellular rubber body.

In the typical practice of our invention, the cured cellular rubber body is first provided over a part or all of its surface with a layer of the liquid plastisol which is almost invariably at room temperature. This layer can be of any suitable thickness say from 0.005 to 0.125 inch. An ultimate fused layer of the thickness has good flexibility and gives good protection to the underlying cellular rubber body. Heat is then aplied to the plastisol coating from any suitable external source, e. g., a surrounding gaseous atmosphere at a temperature of at least 300° F., to fuse the plastisol, i. e., cause the particles of vinyl resin therein to be dissolved by the liquid plasticizer to form a single phase material which upon cooling approximately to room temperature becomes a tough solid material as is well-known in the plastisol art.

The preferred method of applying heat to fuse the plastisol coating comprises placing the plastisol-coated cellular rubber body in a hot gaseous atmosphere, such as hot air, typically at 400–450° F.

We prefer not to fuse the plastisol coating by direct heat transfer from a highly conductive surface. However, as will appear hereinafter, we can disperse the cellular rubber body surrounded by plastisol in a metal mold and subject the assembly to the action of heat by placing it in a hot gaseous atmosphere to effect fusion of the plastisol.

If a portion of the surface of the cellular rubber body is not coated with the plastisol, we find that it is essential, to prevent collapse or irreversible thermal deterioration of the cellular rubber body, to insulate the uncoated portion with a suitable insulating material capable of resisting the degree of heat, typically 400–450° F., applied for the fusion. Any suitable insulating material can be used for this purpose, examples being wood, porcelain, cellular glass, asbestos-containing fiber board or any other type of fiber board capable of withstanding the heat.

As those skilled in the plastisol art know, when a vinyl plastisol is heated it goes through a change which can be termed gelatinization which can take place at temperatures as low as 115° F. depending upon the time exposed. However the film produced under this condition is very weak and requires exposure to higher temperatures—300° F. as a minimum—to obtain fusion of the film. Such fusion, which effects complete solution of the resin particles in the plasticizer and coalescence of the plastisol into a single phase material, is essential to the attainment of a film which upon being cooled, say to room temperature, will possess good strength and abrasion resistance. Once the film has been fused it can immediately be stripped from the mold or plate with which it was in contact during the fusion but it is rather tender at the higher temperatures and should be cooled to 130° F. or lower, before being subjected to the rough handling encountered in factory conditions. A fused plastisol is not liquid at the higher temperatures referred to, and in this sense does not possess a thermoplastic nature at such temperatures and thus behaves quite differently from say polyethylene which changes from a solid to a liquid when heated to temperatures of that order.

The heating step is so conducted that the plastisol coating is brought to a temperature of a least 300° F. and usually not over 450° F. and maintained at this temperature for a period of time long enough to completely fuse it. The time required will depend upon the thickness of the plastisol layer but will usually range from 1 to 15 minutes, the longer times being required with the thicker coatings. The application of heat should be discontinued as soon as possible after the fusion is completed since otherwise heat may be transmitted through the fused layer to such an extent as to cause objectionable collapse and deterioration of the underlying cellular rubber body. The discontinuance of the application of heat is usually effected by removing the coated article from the heating zone and allowing it to cool, typically to 130° F. or lower.

By proceeding in the above manner, any article of cured cellular rubber can be provided with an attractive (usually pigmented to enhance appearance), tough, durable, water-resistant, impervious, wear-resisting coating of a fused vinyl resin plastisol without impairment of the physical properties of the cellular rubber body. Thus there can be obtained an article which combines the advantages of a plasticized vinyl resin exterior with the light-weight, cushioning features of the cellular rubber body. The cellular rubber body can be either of the sponge type or of the closed-cell type and it can be made either by foaming rubber latex in known manner or by chemically blowing a solid rubber compound using any suitable blowing agent. The rubber can be natural rubber, GR-S, Buna N, a rubbery copolymer of a major proportion of isobutylene and a minor proportion of aliphatic conjugated diolefin (butyl rubber), neoprene, etc. The techniques for making the cellular rubber body are well-known and need not be described in detail. The cellular rubber body is, of course, vulcanized prior to use in our invention.

When applying our invention to closed-cell cellular rubber in distinction to open-cell rubber (e. g., sponge or foam), more careful control of the application of heat is required, in order to prevent absorption of too much heat by the closed-cell rubber body which would cause undesired expansion of the closed-cell structure. Also the extent of adhesion of the fused plastisol coating to the surface of the closed-cell rubber may be somewhat less because of the smoother surface of the closed-cell rubber compared to the pervious surface of foam or sponge rubber. However we have successfully used closed-cell rubber bodies in the practice of our invention.

If any portion of the surface area of the cellular rubber body is not protected against the fusion heat either by the plastisol coating or by extraneous insulation, that portion will break down and be seriously deteriorated during the heating step. This is particularly the case with bodies made from foamed rubber latex.

As is well-known, a plastisol is a paste of a finely divided vinyl resin, almost invariably polyvinyl chloride, and a plasticizer therefor which almost invariably is a high-boiling organic liquid capable upon the application of heat of dissolving the vinyl resin to form a fused homogeneous (single phase) material which upon cooling to room temperature is a solid material capable of retaining its shape and having the properties of toughness and good abrasion-resistance. The plastisols are very well-known materials being described, for example, in British Patent No. 500,298, in an article by Powell et al. which appeared in issue No. 263 of Official Digest, published December 1946 by the Federation of Paint and Varnish Production Clubs, and in an article by Partridge et al., Rubber Age (New York), vol. 67, pages 553–560 (August 1950). As is well-known in the plastisol art, a single plasticizer or a blend of plasticizers can be used therein with substantially equivalent results.

The plastisols usually comprise from 50 to 200 parts of the plasticizer per 100 parts of the powdered vinyl resin. In the practice of our invention we usually use pigmented plastisols and we add conventional light and heat stabilizers for the vinyl resin, as desired. The amount of pigment can vary over a wide range, say from 2 to 20 parts per 100 parts of vinyl resin, depending upon color, fire-resistance, etc.

In the practice of our invention the temperature rise in the body of cellular rubber is usually so limited that a temperature not higher than 200° F. is attained in the body over substantially the entire extent thereof. Of course the temperature of the cellular rubber in a minutely thin layer thereof immediately adjacent the plastisol coating may reach the temperature of the plastisol, i. e., 300° F. or higher, but the temperature at any substantial distance within the body, measured from its surface, will not usually exceed 200° F. and often will not exceed 125° F. This is illustrated in the following example of the practice of our invention.

*Example I*

A vulcanized GR-S latex foam cushion was adhered to a ½" piece of plywood after which the exposed surface of the foam cushion was coated with a plastisol having the following composition:

| | Parts by weight |
|---|---|
| "Geon 121" (polyvinyl chloride) | 75 |
| "Marvinol VR-10" (higher melting polyvinyl chloride than Geon 121) | 25 |
| Dioctyl phthalate | 50 |
| "Plastolein 9720" (plasticizer of the polymeric polyester type) | 20.0 |
| "Paraplex G-60" (polyester resin plasticizer of type disclosed at Ind. Eng. Chem., 37, 504 (1945)) | 5.0 |
| "Dyphos" (dibasic lead salt of the phosphorous acid) | 2.5 |
| Pigment | 6.0 |

The coated foam cushion was then allowed to drain sufficiently to give a uniform top and side coating whereupon it was placed in an oven and the coating was fused at 410° F., this being the temperature of the air in the oven. A thermocouple was placed in the bottom of the cushion extending to a point ½" from the top of the cushion. After 6 minutes at 410° F., necessary to completely fuse the plastisol, the temperature in the foam cushion indicated by the thermocouple reading was only 98° F. The thermal insulating value of the fluid or fused plastisol film is shown by the temperature differential between 410° F. and 98° F. This insulating quality is adequate only for the short period of time required to fuse the plastisol and is not to be taken as meaning that solid vinyl film is a good insulating material compared to materials generally said to have very low heat conductivity.

*Example II*

An alternative formulation of a plastisol suitable for forming the outer coating is as follows:

| | Parts by weight |
|---|---|
| "Geon 121" | 100 |
| Dioctyl phthalate | 70 |
| "Dyphos" | 2.5 |
| Color | 6.0 |

Our invention can be applied to cellular rubber bodies of any shape, e. g., round, rectangular, and channeled foam or sponge rubber, such as is commonly used for windlacing or door channels. It is applicable for coating flat cellular rubber sheets. It is applicable for coating foam rubber cushions of any shape. It can be used to make a vinyl-coated foam rubber latex arm rest. It can be used for making a locker sandal platform as described more fully hereinafter. It can be used for making a Navy underwater swin suit in which foam rubber of suitable thickness, e. g., ¼" is formed into a suit, dipped into a plastisol and the plastisol fused to form a water- and wear-resistant coating on the outside. Numerous other applications of our invention will be obvious to those skilled in the art.

In the manufacture of cushions, arm rests, mattresses and the like from foam rubber it is common practice to enclose a body of cured foam rubber having the desired shape in a fabric envelope or the like in order to impart an attractive appearance and protect the tender surface of the foam body from deteriorating influences, such as light and abrasion. However the provision of such a fabric envelope entails a great amount of specialized labor. Furthermore the envelope moves relative to the foam body. In addition, the fabric envelope is pervious to air and water and shows an undesirable tendency to become soiled. The present invention overcomes these disadvantages in a simple and commercially feasible manner.

It will be understood that the surface of the final plasticized vinyl resin coating is relatively smooth, unless a pattern is imparted thereto by a mold, as shown in Figs. 5 to 9, and is impervious and does not readily pick up dirt.

Referring to Figs. 1 to 3 of the drawings, in Fig. 1 a rectangular strip 1 of vulcanized cellular rubber, e. g. which is made by vulcanizing foamed rubber latex, is provided in any suitable way with a coating 2 of a plastisol. Coating 2 completely surrounds strip 1. The resulting coated strip is placed on tray 3 in oven 4 provided with pipes 5 as a source of heat. The air in oven 4 is at a temperature of 300–450° F. and the heating is prolonged for a time sufficient to fuse the plastisol 2 but not sufficiently in excess of such a time as to appreciably injure the properties of core 1. The resulting coated article is portrayed in Fig. 3.

In Fig. 4 the bottom side of core 1 is not coated with plastisol but is protected by insulation 6 against the deteriorating action of the heat applied during the fusing step.

Figure 9:
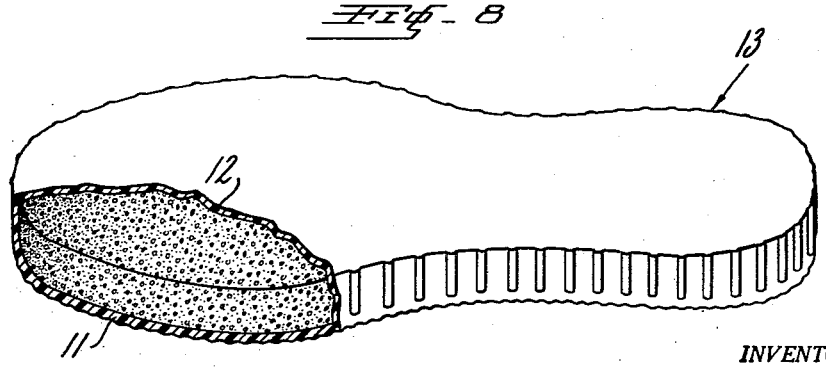
Fig. 9 shows a locker sandal platform made by the method shown in Figs. 5 to 8.

Figs. 5 to 9 portray the manufacture of a locker sandal platform in accordance with our invention. As is shown in Fig. 5, an engraved sole mold 7 is sloshed with a plastisol to form a coating 8 over the bottom and a portion of the sidewall thereof. The sloshing is done by simply pouring a predetermined amount of the plastisol into the mold 7 and then manipulating the same to flow the plastisol so as to form the coating 8. Mold 7 is preferably ¾" deep. As is shown in Fig. 6, a piece 9 of cured foam rubber having the configuration of a shoe sole is then inserted into the mold so as to be surrounded on its bottom and sidewalls by plastisol coating 8. More plastisol is then poured over the top surface of the foam rubber piece 9 and is flowed evenly across the top thereof so as to completely enclose it in plastisol. A weight 10 (conveniently in the form of a metal plate) is then placed over the coated foam rubber so as to cause the foam rubber to be immersed completely in the plastisol and prevent it from floating therein. In this way a coating 12 over the top surface is obtained. Weight 10 should be just heavy enough to keep the foam rubber piece 9 from floating but should not be so heavy as to give an undesirably thin coating 11 on the bottom of piece 9. The relative thickness of the tread coating 11 and the upper coating 12 can be adjusted by adjustment of weight 10. Typically, conditions are so adjusted that tread 11 is substantially thicker than upper layer 12. The unit is then placed in the oven 4 in which the air is at a temperature of 400–450° F. for 15 minutes to effect fusion of the plastisol. After fusion the unit is allowed to cool whereupon the plasticized resin-coated foam rubber platform 13 (as shown in Fig. 9) is removed from the mold.

An alternative method of processing involves the use of a pre-gelled plastisol coating on the mold after which the foam rubber (or other cellular rubber body) is inserted and additional plastisol is added to cover the balance of the foam rubber and form the upper layer thereon. For example, to reduce floating of the sponge in the plastisol in the manufacture of a locker sandal platform we sloshed the plastisol into the mold 7 and subjected it to sufficient heat to gel it (but insufficient to fuse it), after which we laid the pre-formed piece of cellular rubber 9 in the cavity and poured plastisol over the upper surface thereof, whereupon we subjected the assembly to heating in an air oven at 300° F. or higher for a time sufficient to fuse the plastisol (both the pre-gelled plastisol and the plastisol which had been poured on the top). The fusion of the plastisol integrated the pre-gelled plastisol and the plastisol which formed the upper layer. This method does not produce adhesion of the pre-gelled plastisol to the cellular rubber body, the pre-gelling of the plastisol preventing such adhesion, but it has definite advantages in simplifying manufacture and it gives a product which is quite satisfactory for many purposes, e. g. for a locker sandal platform. The pre-gelled plastisol protects the portion of the cellular rubber in contact therewith against degradation during the fusing step.

In practicing our invention we particularly prefer to use a cellular rubber body having a porous or pervious surface, especially one with inter-communicating cells, e. g., foam rubber made from foamed rubber latex or sponge rubber. The reason for using a cellular rubber body having such a surface is that the plastisol penetrates the pores of the surface during fusion, resulting in better mechanical locking of the final plasticized vinyl resin coating to the cellular rubber body than would otherwise be secured. If a closed-cell rubber body is used it is preferable that its outer surfaces be cut surfaces so as to present a rough surface rather than a smooth skin.

The degree of adhesion of the final plasticized vinyl resin coating to the cellular rubber body can be controlled by varying the surface of the cellular rubber body through various degrees of coarseness and smoothness as well as by controlling the weight of the body 10 used to hold the cellular rubber article submerged (and if desired to seal the mold) and perhaps also by varying the pressure exerted upon such a body. This is a minor aspect of the invention and can be readily worked out in the practical performance of our invention. No problem of securing good adhesion is ordinarily encountered.

From the foregoing description many advantages of the present invention will be immediately apparent to those skilled in the art. It will be seen that the present invention provides a valuable new article of manufacture, namely a cellular rubber body having a tenaciously adhering impervious plasticized resin coating bonded directly to the cellular rubber body (in contrast to Thompson et al. 2,629,678 who contemplate use of a layer of fabric to bond a synthetic resin layer to a body of foamed latex sponge rubber). The invention also provides a simple and commercially feasible method of producing such an article. Numerous other advantages will be apparent to those skilled in the art.

Having thus described our invention, what we claim and desire to protect by Letters Patent is:

1. The method which comprises coating a portion of a body of cured cellular rubber, said rubber being selected from the group consisting of natural rubber, rubbery butadiene-styrene copolymer, rubbery butadiene-acrylonitrile copolymer, butyl rubber, and polymer of 2-chlorobutadiene, with a plastisol comprising polyvinyl chloride and plasticizer therefor, placing the thus-coated body in an atmosphere of gas at a temperature of 300° F. to 450° F. for a period of time sufficient to fuse the plastisol coating but not substantially in excess of such time, during said last-mentioned step insulating the uncoated portion of said body from the heat with heat insulating means other than said plastisol, the plastisol serving as a heat-protective shield for the portion of said body coated therewith, said plastisol and said insulating means thereby preventing the temperature in substantially the entire body of said cellular rubber core from exceeding 200° F., the temperature on the outer surface of said plastisol in excess of 200° F. during the fusion of said plastisol.

2. The method which comprises coating the bottom and side walls of an open mold with a plastisol comprising polyvinyl chloride and plasticizer therefor, placing a body of cured cellular rubber within the thus-coated mold, said rubber being selected from the group consisting of natural rubber, rubbery butadiene-styrene copolymer, rubbery butadiene-acrylonitrile copolymer, butyl rubber, and polymer of 2-chloro butadiene, applying said plastisol on the upper portion of said body in such a way as to completely enclose said body with plastisol, and placing the resulting assembly in an atmosphere of gas at a temperature of 300° F. to 450° F. for a period of time sufficient to fuse said plastisol but not substantially in excess of such time, said plastisol serving as a heat-protective shield for said body during exposure to said atmosphere of gas, thereby preventing the temperature in substantially the entire body of said cellular rubber from exceeding 200° F. during the fusion of said plastisol, the temperature of the outer surface of said plastisol being in excess of 200° F. during the fusion of said plastisol.

3. The method as recited in claim 2 wherein a weight is applied to the upper plastisol-coated portion of the body of cellular rubber to hold said body submerged in the plastisol during the heating step.

References Cited in the file of this patent

UNITED STATES PATENTS

| | | |
|---|---|---|
| 2,106,840 | Gould | Feb. 1, 1938 |
| 2,161,024 | Doolittle | June 6, 1939 |
| 2,275,235 | Shanklin et al. | Mar. 3, 1942 |
| 2,327,128 | Renfrew et al. | Aug. 17, 1943 |
| 2,354,430 | Greenup et al. | July 25, 1944 |
| 2,431,745 | Flanagan | Dec. 2, 1947 |
| 2,530,441 | Reinhardt et al. | Nov. 21, 1950 |
| 2,585,435 | Chadbourne | Feb. 12, 1952 |
| 2,614,059 | Cooper | Oct. 14, 1952 |
| 2,626,886 | Scholl | Jan. 27, 1953 |